Feb. 7, 1967 M. AUPOIX 3,302,303
DRYING SYSTEM
Filed Feb. 17, 1964 16 Sheets-Sheet 1

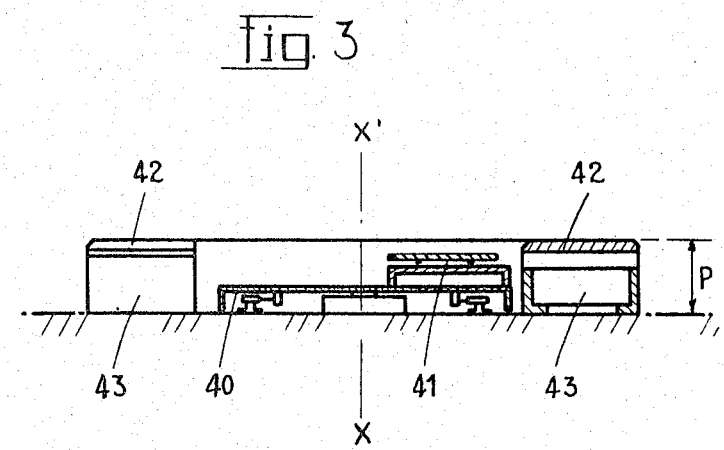
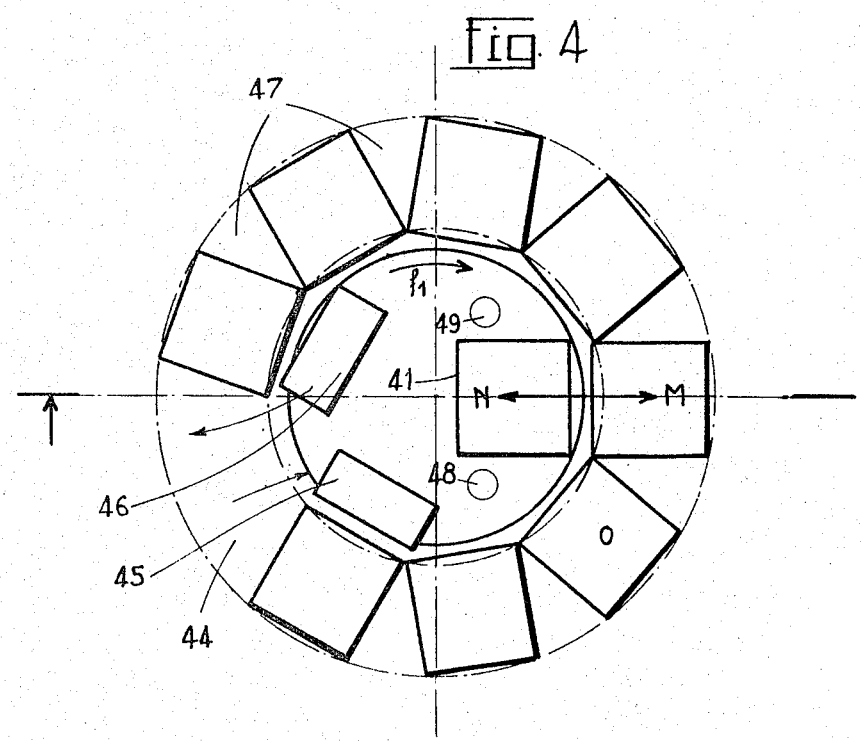

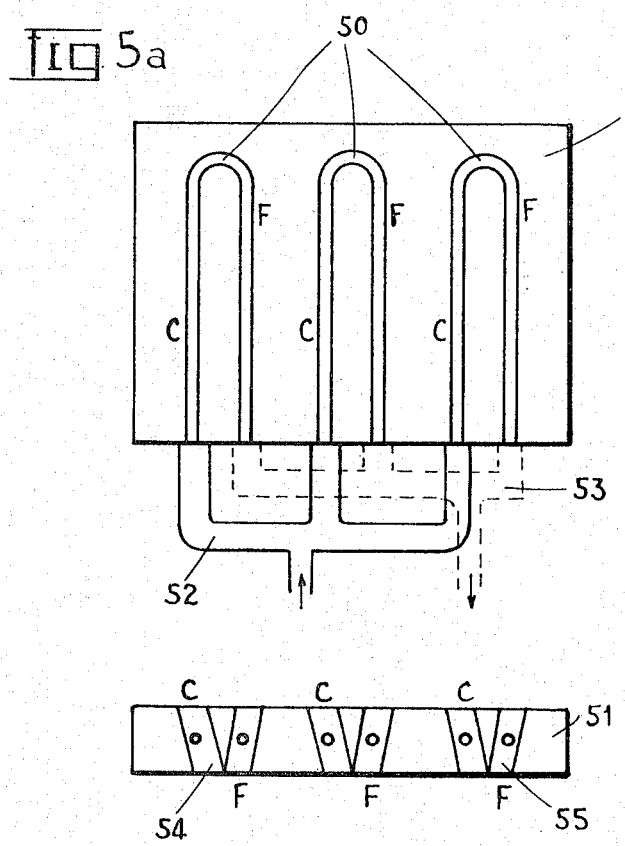

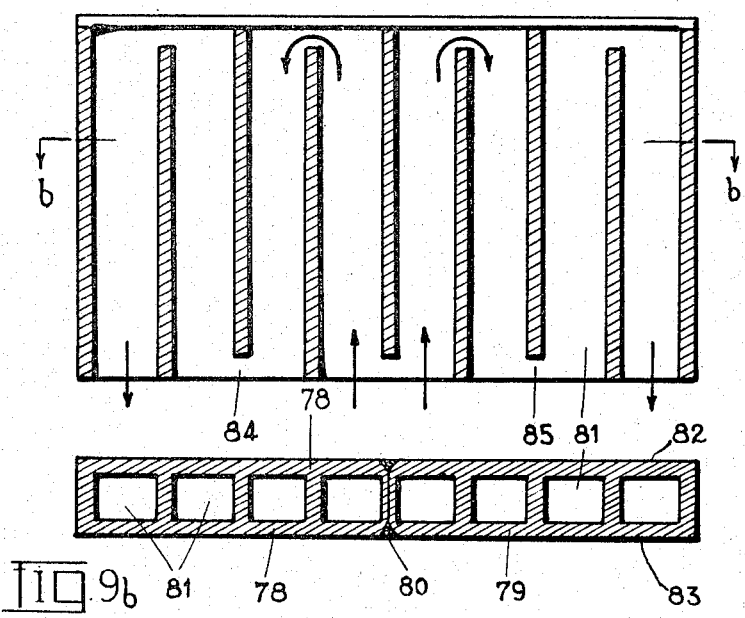
Fig. 9a
Fig. 9b
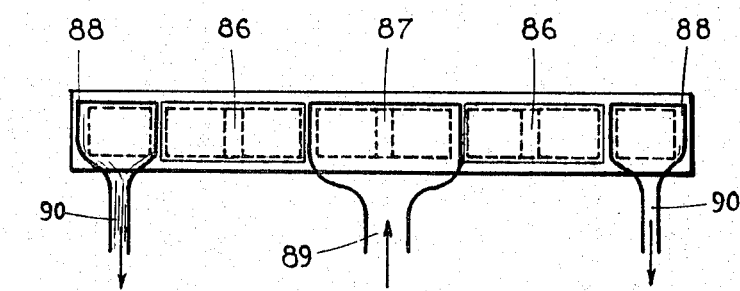
Fig. 9c

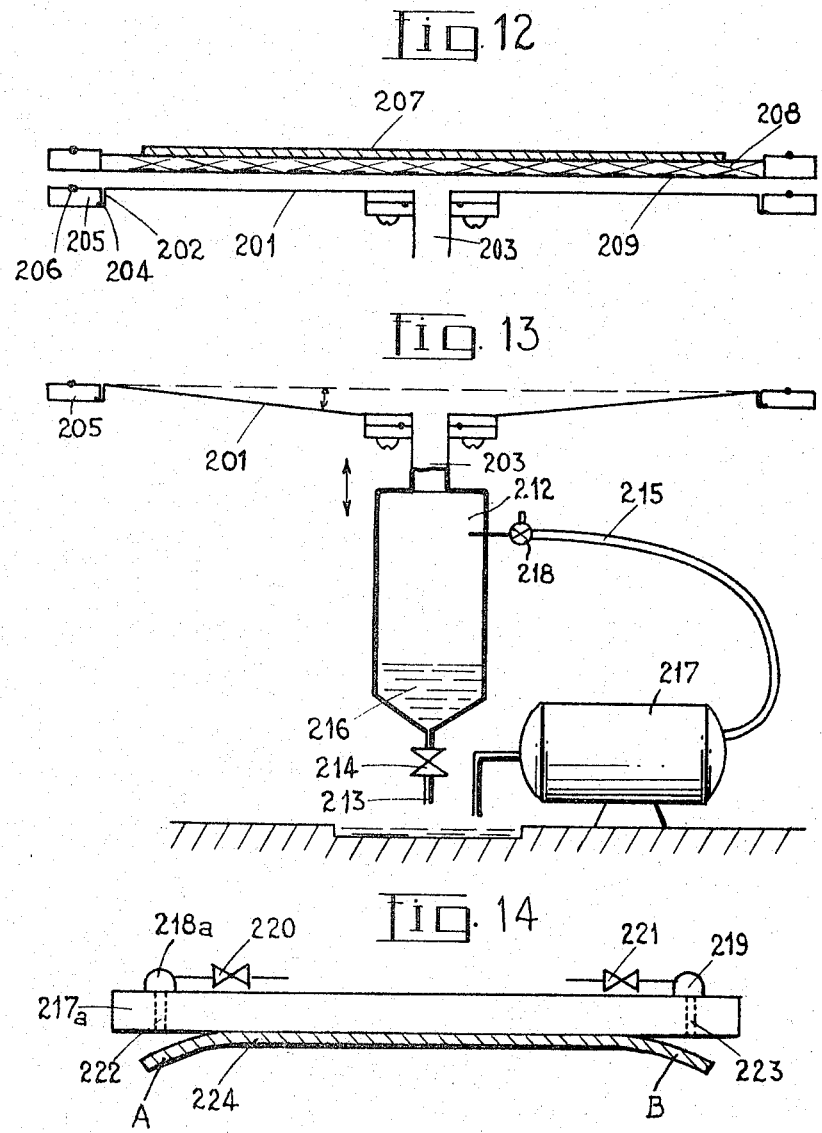

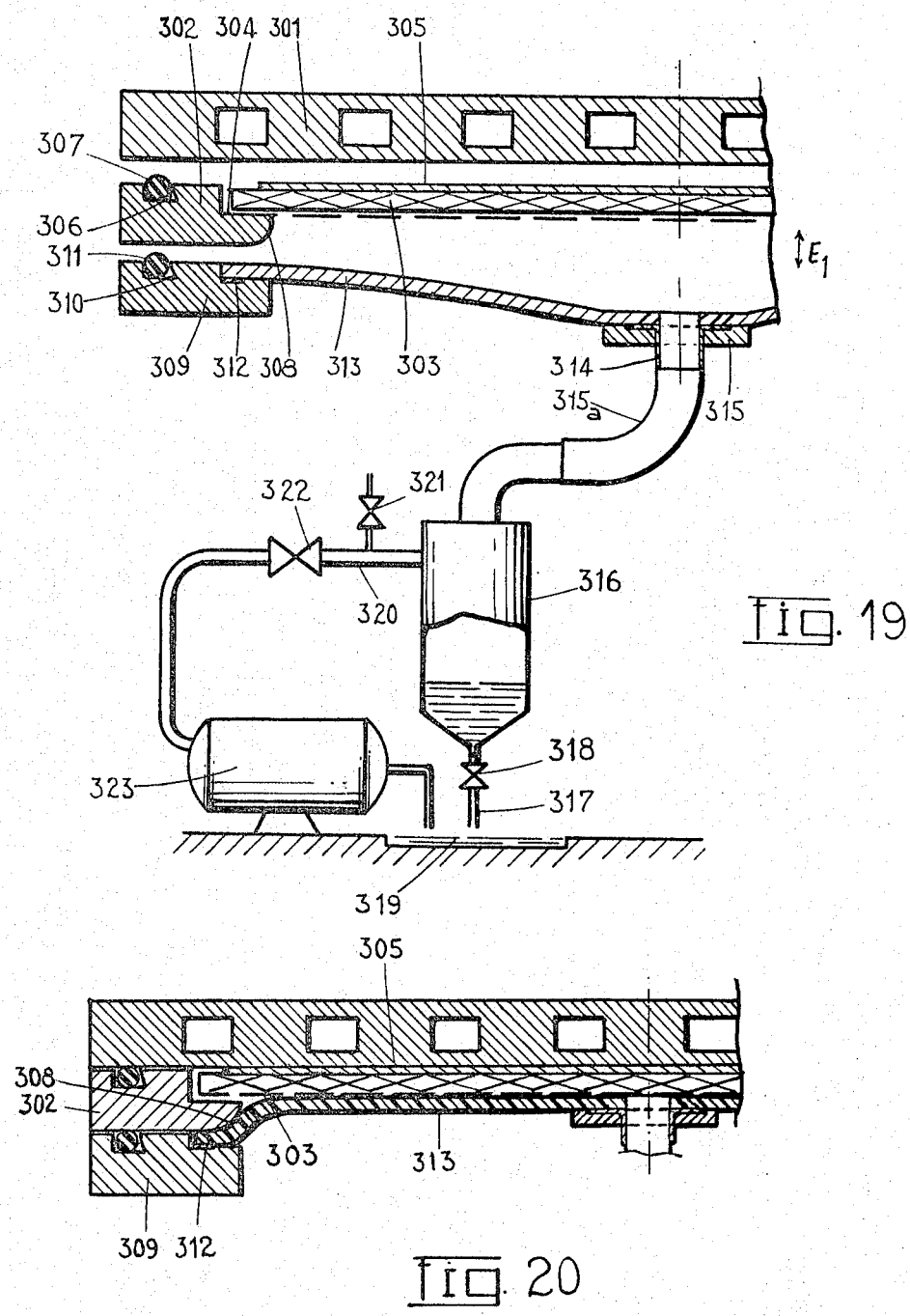

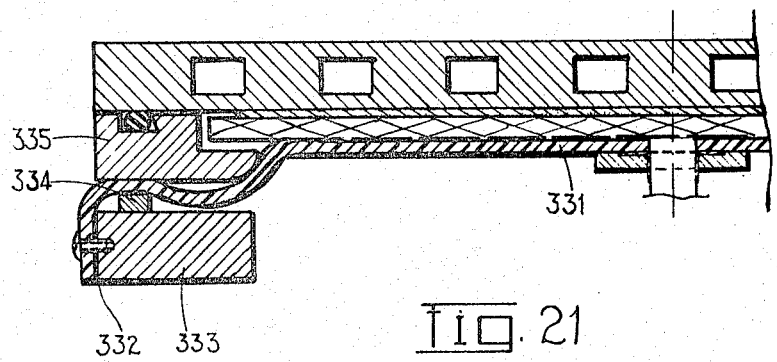

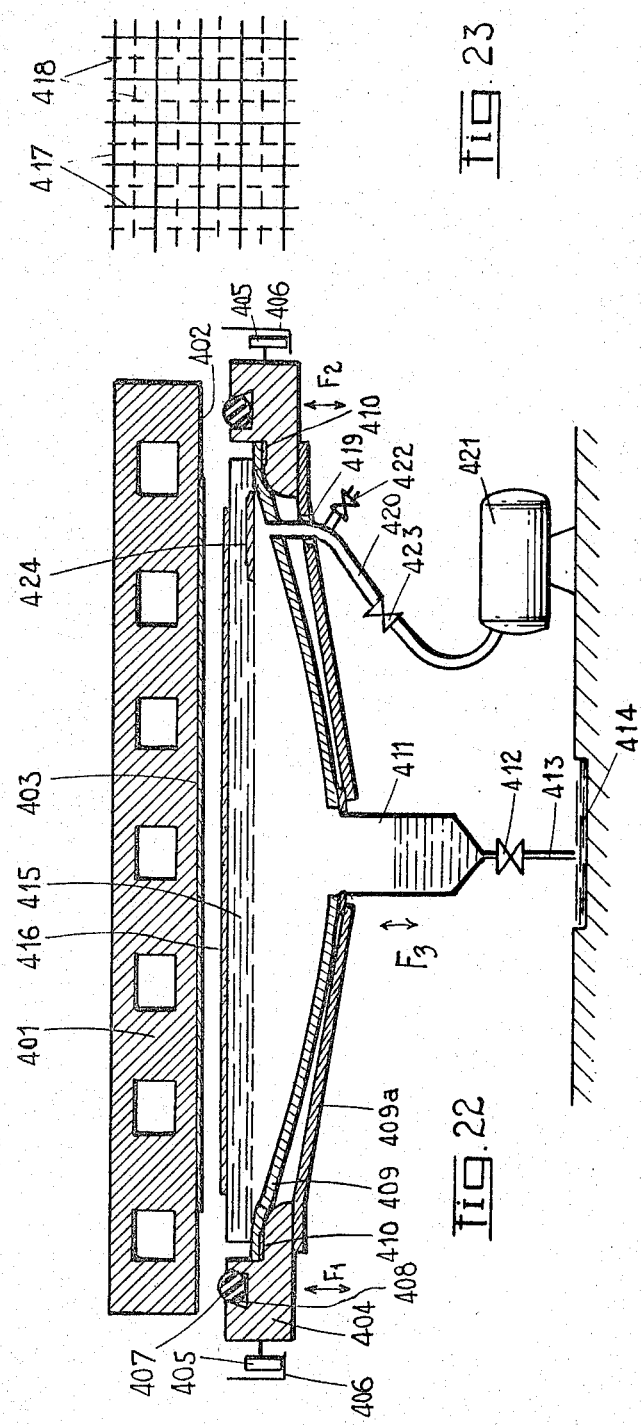

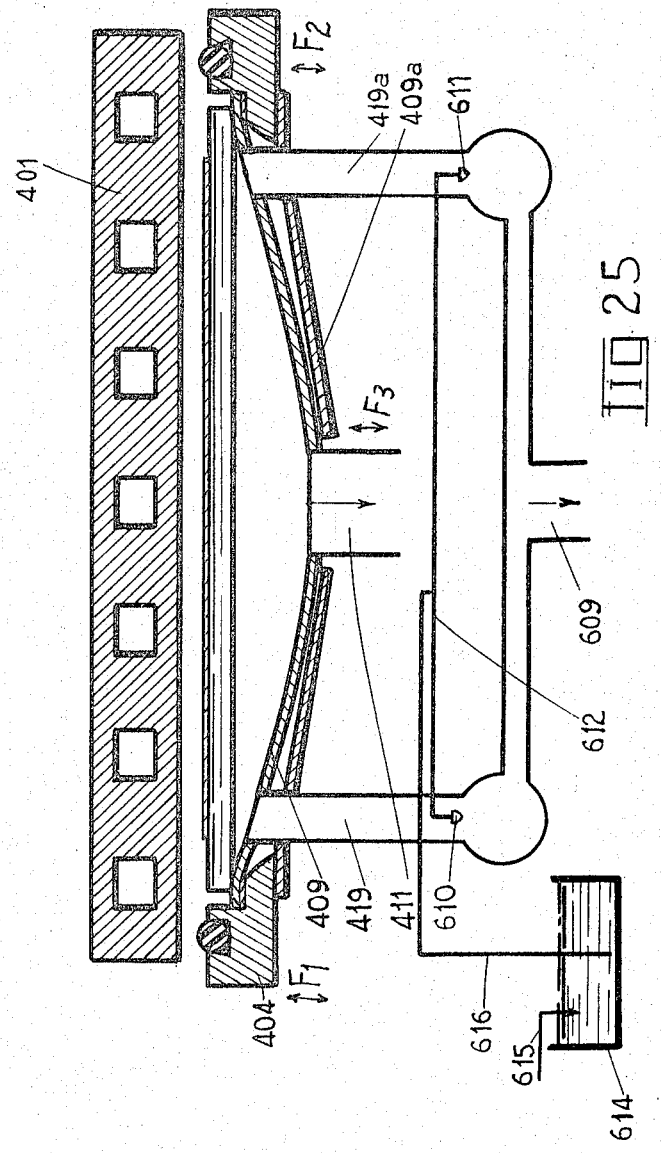

United States Patent Office 3,302,303
Patented Feb. 7, 1967

3,302,303
DRYING SYSTEM
Marcel Aupoix, Paris France, assignor to Societe Generale du Vide, Choisy-le-Roi, Seine, France, a French corporation
Filed Feb. 17, 1964, Ser. No. 345,272
Claims priority, application France, Feb. 26, 1963, 925,992, Patent 1,364,603; May 17, 1963, 935,221
36 Claims. (Cl. 34—145)

This invention relates to vacuum drying apparatus of a kind which is especially applicable to the drying of animal skins or hides.

Raw hides contain a considerable amount of water and organic fluids which must be partly eliminated during the processing of the hides into leather, to a final proportion of about 12 to 14% moisture in the finished article. The drying operation must be conducted with care lest the quality of the leather be impaired. Thus, shrinkage, wrinkling, uneven tension, damage to the grain of the skin, and staining, must be prevented.

The simple method of suspending the hides from hangers in a tunnel through which warm air is discharged is unsatisfactory because the resulting dried skins are warped and shrunked and their final moisture content is non-uniform. Moreover, the process is very lengthly, consumes much energy and requires extensive space.

One widely used method of drying leather and skins is to bond it with adhesive to plates of glass or the like which are then placed in compartments through which hot air is discharged. The results are somewhat more satisfactory, However the quality of the dried skin still is imperfect, because the heating proceeds from the flesh side inward, and the condensed effluent fluids are apt to stream over the skin. Moreover the adhesive used must subsequently be washed off the dried skin with water or another solvent thereby again wetting the skin so that its final moisture content is not strictly controllable. Further this process again requires considerable energy and time, about 4 or 5 hours.

The application of vacuum for drying skins and the like is well known to be advantageous, primarily because it permits a reduction in the temperature required to remove the fluids from the article, thereby improving both the quality of the dried article and the economy of the process. Vacuum drying apparatus has already been proposed wherein the skin to be dried is supported on a inflexible porous plate fixed within a sealed compartment with the upper surface of the skin applied against a flexible heated surface, and suction is applied into said compartment to draw out the fluids from the under side of the skin through its porous supporting plate. Such apparatus has advantages over the other types of prior-art apparatus mentioned above, but has its own drawbacks. The grain of the skin is subjected to undesirable strains and tensions between its supporting plate and the heating surface. Also the flexible heated surface is a poor conductor of heat being made of rubber. In addition to the above defects affecting the quality of the dried skin, the apparatus is relatively difficult to service since charging and discharging involve unscrewing and replacing a cover plate of the compartment, and its operation is not easily amenable to automation. During the discharging and charging process the skin is apt to remain some time in contact with the heating surface while at atmospheric pressure, and this impairs the quality of the dried skin.

Objects of this invention are to provide improved vacuum drying apparatus, especially for animal hides and the like, which will possess some and in its preferred aspects all of the following advantageous features:

An improved "inverted" lay-out whereby the article is heated at its upper surface by a rigid metallic member while being exposed to suction at its under surface thereby permitting free outflow of at least a major part of the extracted fluid constituents by gravity.

Simple and accurate regulation in respect to the parameters temperature, pressure and time, making it possible to achieve consistently a precisely predetermined, uniform, final degree of humidity in the dried skins.

Support for the article being dried is a cool unheated surface when at atmospheric pressure, preventing blistering and promoting a condensation of the vapours extracted from the articles without any possibility of the condensates streaming over the article so as to stain or otherwise damage the dried product, Support of the articles, such as hides, in a free, untensioned manner during the drying process so as to improve the condition of the dried articles and permit a safe and effective processing of even the most delicate skins, prevent wrinkling, grain damage and other defects therein, while at the same time preventing shrinkage;

A uniform application of pressure to the articles with automatic allowance for minor variations in thickness from place to place in any article as well as from one article to another.

A considerable reduction in the time required to dry a given article as well as in the energy consumption, both in regard to heat and pump power requirements.

Greatly facilitated servicing of the drying apparatus especially in regard to charging and discharging operations, with the possibility of readily applying full or partial automation to the drying plant and achieving high-output, cyclic, automatic operation.

Other objects and advantages will appear.

The invention in its major aspect provides apparatus for drying flat sheet-like articles, e.g., hides and skins, which comprises heating means having a flat downwardly directed heating surface, perforate supporting means having an upwardly directed surface engageable with the article, a deformable sheet member having its periphery sealingly engageable with said heating surface around the article and the supporting means and defining a sealed enclosure thereabout and therebelow, means for applying suction to the interior of said enclosure whereby to cause upward deformation of said member which will thereupon act through said supporting means to apply the article upward against said heating surface, and means for discharging effluent fluids downwardly out of the enclosure through said reformable member.

Exemplary embodiments of the invention will now be described with reference to the accompanying drawings wherein:

FIGS. 3 and 4 illustrate in elevation and plan a drying plant embodying a circular array of vacuum drying units of the invention;

FIGS. 5a and 5b illustrate in plan and end view one form of heating table usable according to the invention;

Figure 10:
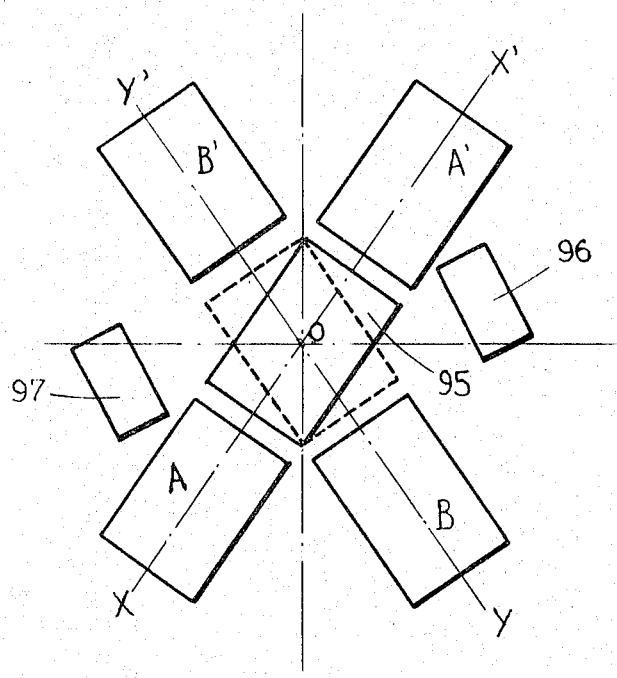
Figure 6:
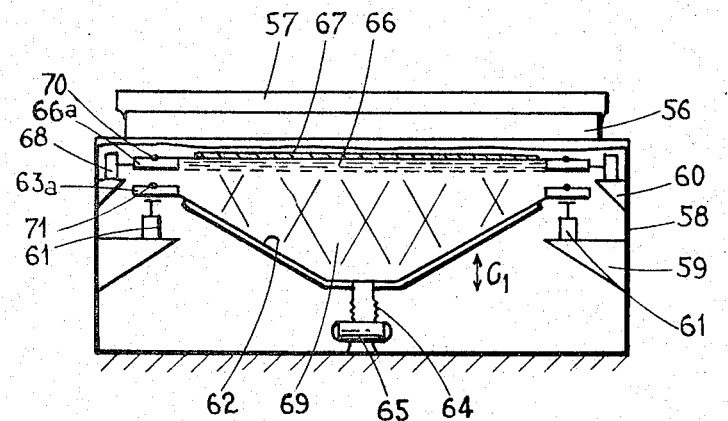
FIG. 6 shows in simplified sectional elevation an embodiment of vacuum drying apparatus of the invention.
Figure 7:
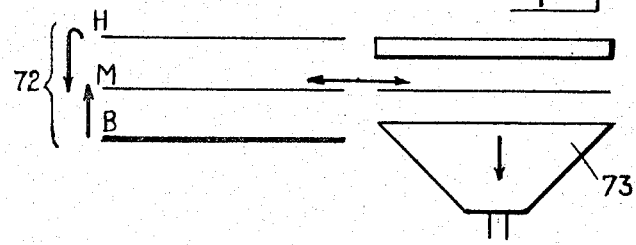
Figure 8:
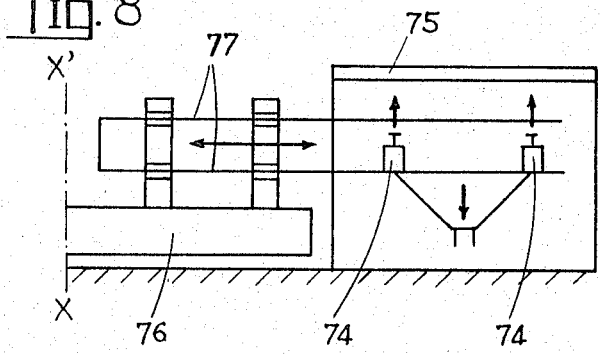
Figure 11:
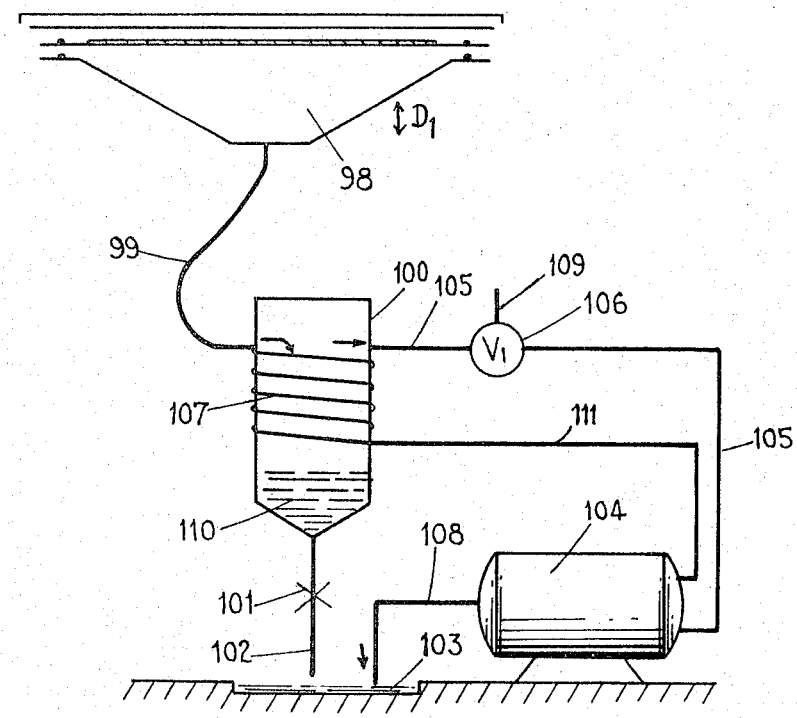
Figure 11B:
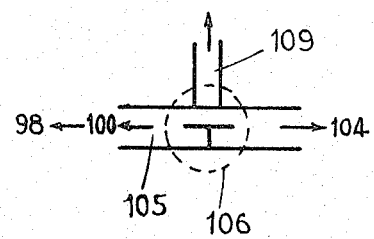
Figure 11A:
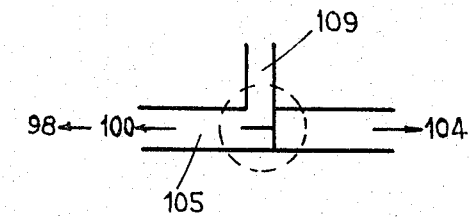
Figure 15:
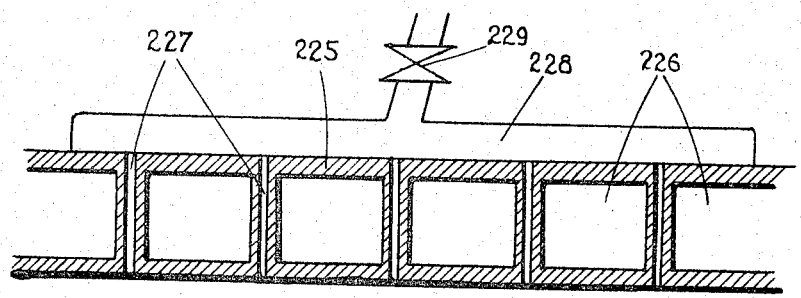
Figure 16A:
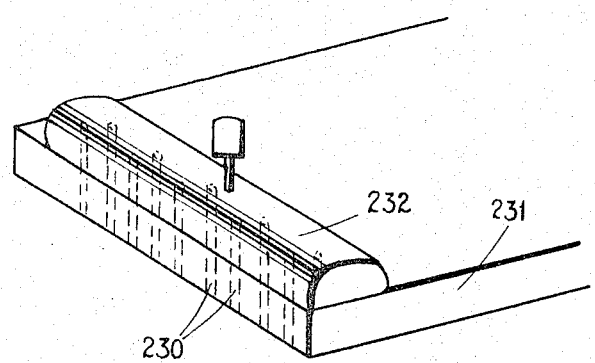
Figure 16B:
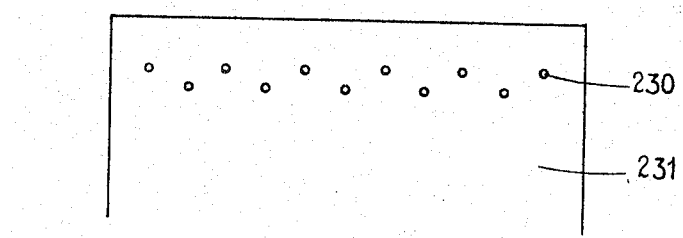
Figure 17:
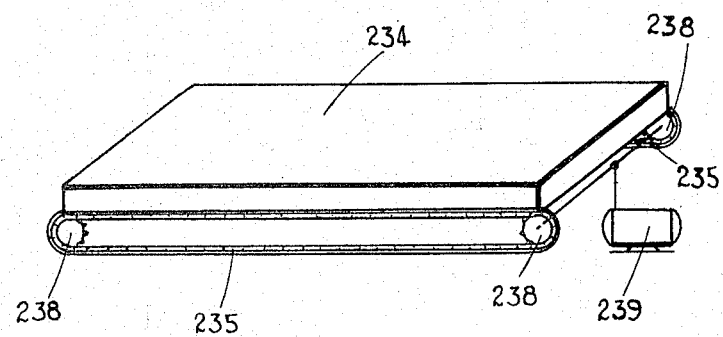
Figure 17A:
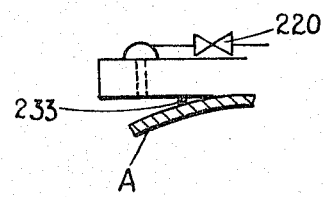
Figure 18:
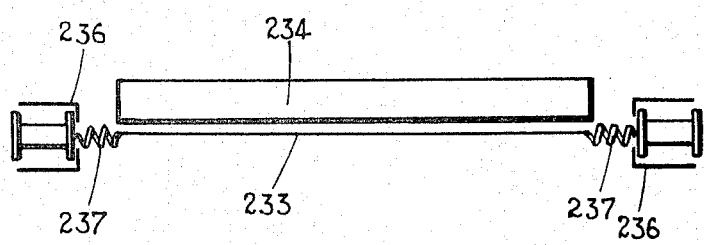
Figure 24:
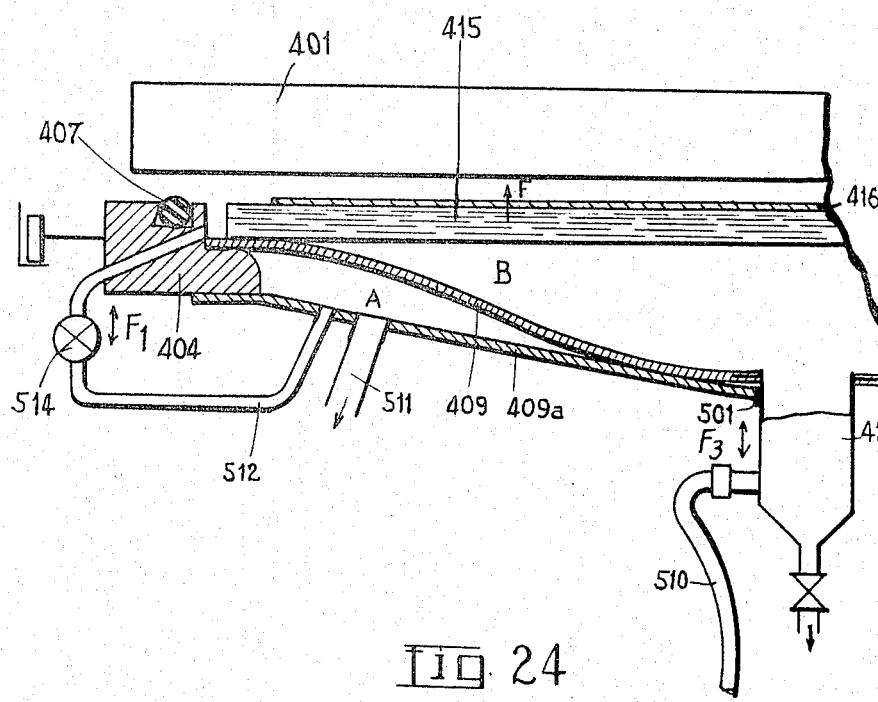
Figure 27:
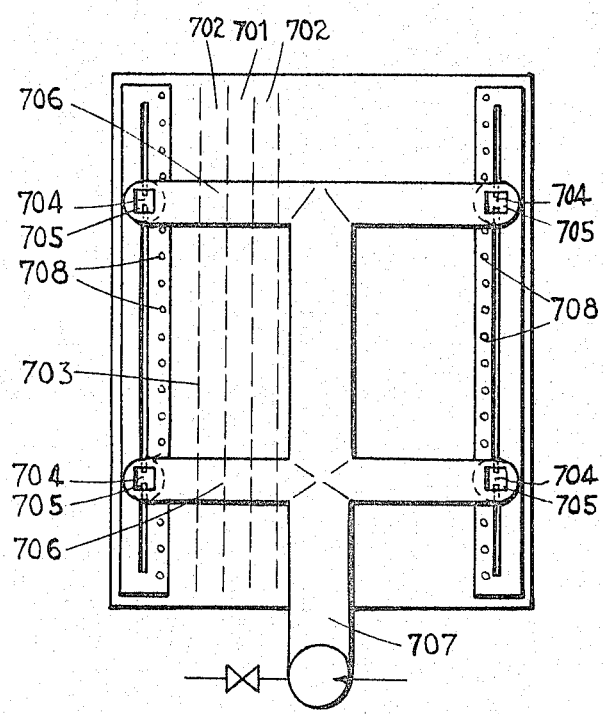
Figure 26:
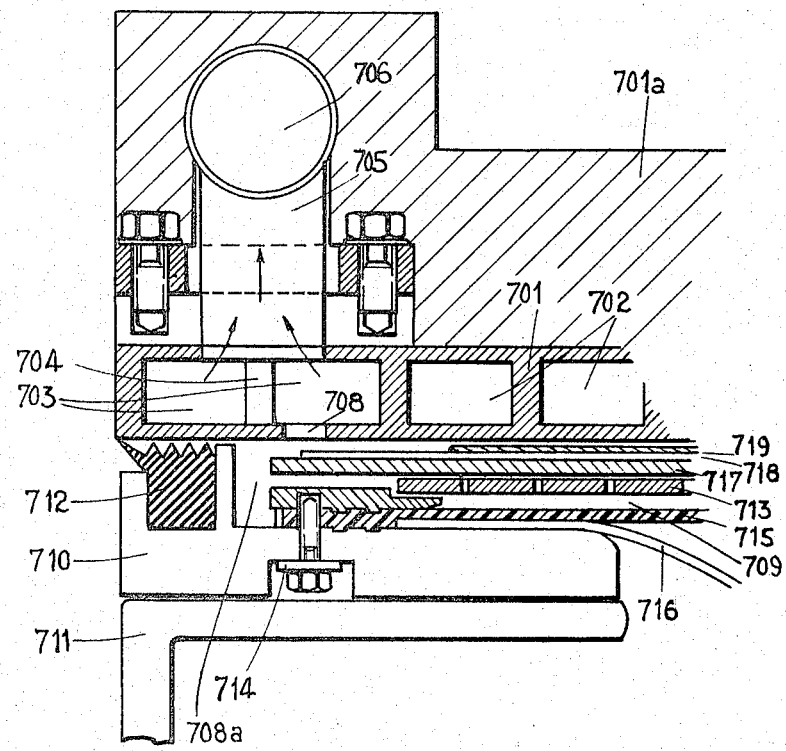
Figure 28:
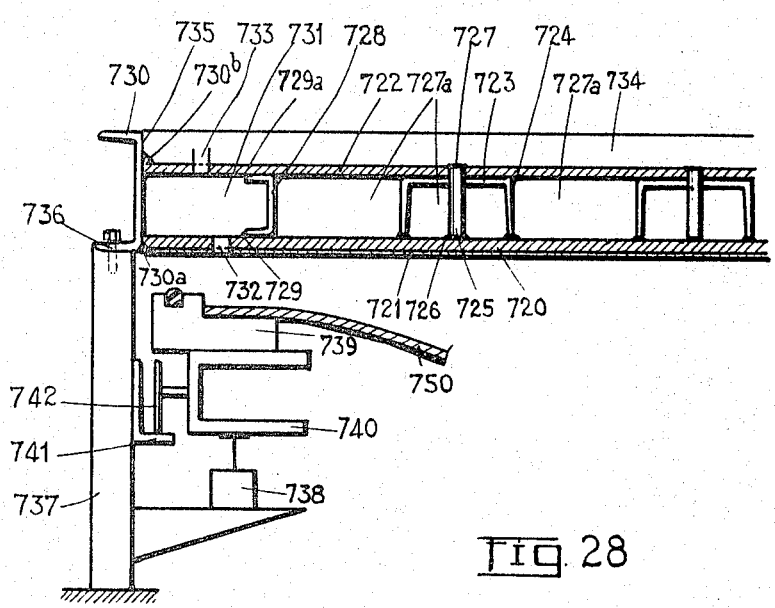
Figure 29:
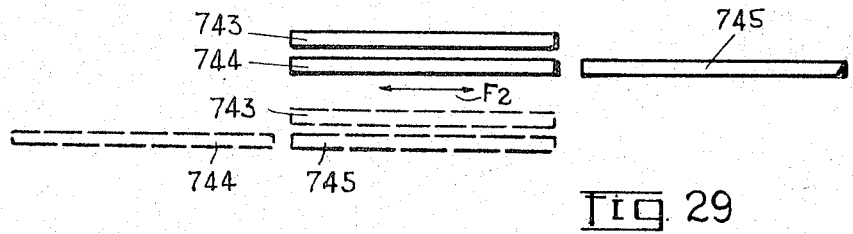

FIG. 7 diagrammatic illustrates servicing of the apparatus of FIG. 6;

FIG. 8 is a simplified elevational view of a modification of the drying plant of FIGS. 3–4;

FIGS. 9a, 9b and 9c show in horizontal section, vertical section and end elevation an alternative form of drying table;

FIG. 10 shows the schematic lay-out of a four-unit drying plant according to the invention;

FIGS. 11, 11a and 11b are schematic vertical view and two details of vacuum drying apparatus according to another embodiment;

FIG. 12 is an elevation of the upper part of drying apparatus of the invention, in the "drying" or "suction" phase of the work cycle;

FIG. 13 shows the lower part of the apparatus of FIG. 12 during the "effluent-discharge" or "venting" phase of the cycle;

FIG. 14 illustrates a skin-separator device used according to the invention and employing pressure fluid discharge nozzles;

FIG. 15 is a section through a heating table incorporating the skin-separator discharge nozzles of FIG. 14;

FIGS. 16a and 16b are a perspective and plan view of one arrangement of the discharge nozzles of FIGS. 14 and 15;

FIGS. 17 and 17a show in perspective and in partial cross section a skin separator device using a traversing wire;

FIG. 18 illustrates the same device as seen transversely of the table;

FIG. 19 is a sectional elevational view, partly schematic, of drying apparatus of the invention in the "venting" or effluent-discharge" phase of the work cycle;

FIG. 20 shows the upper part of the apparatus in the "drying" or "suction" phase of the work cycle;

FIG. 21 is similar to FIG. 20 but relates to a modification;

FIG. 22 illustrates another embodiment of the invention mostly in sectional elevation, in the "venting" or "effluent-discharge" phase;

FIG. 23 is a plan view of a perforate hide-supporting mesh structure;

FIG. 24 shows in partial sectional elevation another form of the invention embodying a differential pressure feature;

FIG. 25 is a simplified view in sectional elevation of an embodiment of the invention including means for discharging cooling water spray for condensing effluent vapours;

FIG. 26 is a view in detailed vertical section of another embodiment of improved drying apparatus wherein the pumping of air into and out of the enclosure is effected from above and through the heating table assembly;

FIG. 27 is an overhead plan view of the drying apparatus shown in FIG. 26, on a somewhat reduced scale;

FIG. 28 illustrates in simplified vertical section a modification of the embodiment of the invention wherein the pumping of air into and out of the enclosure is effected through the heating table assembly as in FIGS. 26–27; and FIG. 29 is a diagrammatic view, in elevation, illustrating the servicing of a drying apparatus unit according to the invention wherein the article-carrier frame is withdrawable and insertable from and into the apparatus unit from either end thereof.

Figure 1:
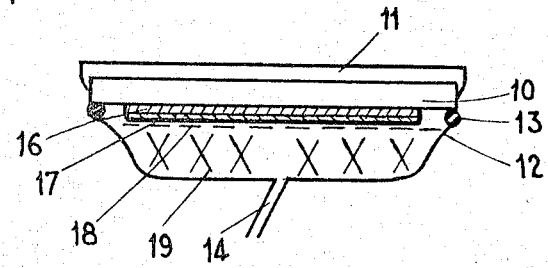
FIG. 1 is a sectional elevation of a simple form of the invention.

In the simple embodiment of the invention illustrated in FIG. 1, the vacuum drying apparatus comprises a heating table 10 provided with heat lagging 11 on its upper surface. The table 10 is removably mounted by way of a sealing strip 13 on the open top of an inverted suction hood 12, made of suitable deformable sheet material. The bottom of the suction hood 12 is connected through a line 14 with a source of vacuum. Cooling jacket means may be provided for circulatng a coolant fluid adjacent the walls and base of the suction hood, but this is not essential. A compressible porous element 17, e.g., made of felt, is supported within the suction hood 12 at an elevation such that a hide such as 16 placed on the porous element 17 will engage the under surface of table 10. The porous element 17 is supported on top of a perforate metal sheet 18 which in turn is supported above the bottom of the vacuum hood 12 by means of metallic pressure-transmitting structure 19.

In the operation of this device, with a hide such as 16 positioned as described, vacuum is applied through the pipe 14 to the interior of suction hood 12. Since the underside of hood 12 is exposed to atmospheric pressure, the walls of the hood will contract upwards so as to raise the bottom of the hood 12. The bottom of the hood then exerts upward pressure which is transmitted through the structure 19, perforate sheet 18 and porous compressible sheet 17 to apply the hide upwardly against the undersurface of heating table 10 under substantial pressure. The drying of the hide thus proceeds for a prescribed period, and fluid constituents pressed out of the hide due to the combined actions of heat, compresion and suction, are drawn out in a downward direction through the porous sheet 17 and perforate sheet 18 into the suction hood 12 and thence into the pumping circuit through pipe 14.

Usually the hide 16 would be placed with its grain side directed upward in engagement with the heating table 10, and flesh side down against the porous supporting sheet 17. Thus the heat flux will flow from the grain side to the flesh side. In some cases as where a hide or skin has been slit to reduce the thickness of the skin to a calibrated value, the position just described may advantageously be reversed, since the flesh side is less permeable than the slit side of the skin.

It will be noted that in the arrangement described the skin or hide is pressed against a cool surface, that of the compressible porous sheet 17, thereby avoiding blisters. The porous support may be regenerated from time to time with a suitable solvent such as acetone. The arrangement is such, furthermore, that the condensed liquid constituents appear only in the suction hood 12 but not in the upper parts of the apparatus and are not liable to stream over the skin being treated. The use of auxiliary heating means as are sometimes used to avoid unwanted condensation is thus completely avoided.

Only the underside of the table requires to be treated against corrosion.

Figure 2:
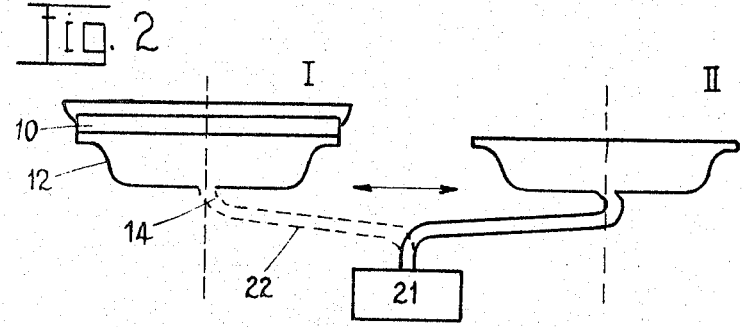
FIG. 2 illustrates how part of the device of FIG. 1 may be alternately shifted between a drying, and a charge-discharge positions.

In the lay-out schematically shown in FIG. 2, the drying suction hood 12 of FIG. 1 is arranged for horizontal displacement between two positions I, and II, for which purpose the vacuum line 22 connecting pipe 14 with suction pump 21 is made flexible. Position I is the operative drying station and underlies heating table 10, and position II is a loading-unloading station.

In the commercial drying plant shown in FIGS. 3 and 4, there is provided a large-diameter turntable 40 provided with suitable means for intermittently rotating it as presently described. Around turntable 40 there are provided a number, herein eight, of drying stations or units according to the invention, with a free space or gap provided at 44 between an end one and a first one of said stations, as shown. A load-unload table 41 is positioned on top of the turntable 40 near its circumference. Each of the drying stations or units may be constructed on the general lines described with reference to FIG. 1 and preferably is of the construction later described with reference to FIG. 6. Each drying unit includes a carrier assembly for a hide, which assembly is movable horizontally into and out of the unit, as will later be described in detail. FIG. 4 shows one such carrier assembled at N, withdrawn out of the related drying unit M and positioned on the table 41. In this position, an operator as at 48 and/or 49, can remove a dried hide from the carrier N and insert a fresh hide in its place, and then reinsert the carrier assembly N into the drying unit M. The turntable 40 is then indexed, manually or preferably automatically, to its next position in the direction shown by arrow f1, so that the next drying unit 0 is positioned adjacent the table 41.

FIG. 4 also shows a pair of wheeled trucks 45 and 46, which may be used to convey wet and dried skins into and out of the drying system by way of the gap 44. Space is available, as shown at 43 underneath each drying unit and at 47 between adjacent drying units, wherein ancillary equipment such as the pumping, heating and cooling apparatus can be positioned. Preferably, all movements are performed automatically, being controlled through any convenient means such as hydraulic actuators which may be provided with damping and braking means and operated under control of suitable programmed control apparatus, e.g., electronic.

The size of the stations is predetermined with reference to the size of the largest hides to be dried, and the number of stations and timing of the turntable indexing are determined to provide the desired time of dwell of the hides under drying conditions.

In one actual arrangement the turntable 40 was 6 meters in diameter and weighed about 4 tons. The circumference circumscribed around the eight drying stations used was about 12 meters in diameter. The system was operated to provide a drying time of about two and a half minutes per hide whereby an output of one hundred dry skins per hour was obtained. It will be noted that owing to the positioning of all the ancillary equipment between and underneath the drying stations as indicated above the total vertical height of the system was relatively very small, being only about 1.5 meters as indicated at P in FIG. 3. Owing to this reduced height simple hoisting equipment can conveniently be provided for handling the trucks such as 45 and 46.

FIGS. 5a and 5b schematically illustrate one convenient construction of a heating table for a drying unit according to the invention. The table shown comprises a metallic molding containing a number, herein three, of U-shaped tubes 50 made, e.g., of galvanized steel for cooling fluid having their ends projecting from a common side of the rectangular plate 51 molded, e.g., from light alloy. The assembly may be hot-rolled. The letter C designates the input or hot leg of each U-shaped tube 51 and F designates the outlet or cool leg. An inlet manifold 52 and an outlet manifold 53 are provided, similar in shape but positioned in reverse relationship and relatively displaced across the thickness dimension of the plate 51, being connected respectively to the input and output legs C and F of tubes 51 by way of connector members such as 54 and 55, which are likewise similar in shape but reversely mounted. The tubing used is of relatively large diameter so as to provide a low velocity of the coolant fluid and promote a uniform distribution of temperatures throughout the surface of plate 51 constituting the heater table.

The drying unit illustrated in FIG. 6 comprises a fixed heating table 56 which may be similar in construction to the one just described and provided with its heat lagging 57. The table 56 is placed on a fixed stand 58. The stand is provided internally with upper brackets 60 and lower brackets 59. The lower brackets 59 carry vertically positioned ram actuators such as 61 by means of which a frame 63a having the periphery of the inverted deformable suction hood 62 attached thereto is supported for upward and downward displacement relative to the heating table 56. The upper brackets 60 support horizontal runways over which a hide carrier assembly including a peripheral frame 66a is horizontally displaceable by way of rollers such as 68. The carrier assembly includes one or more perforate metal sheets 66 and a porous compressible sheet as earlier mentioned upon which a hide such as 66 can be supported beneath the table 56. The suction hood 62 is deformable, and may be provided with cooling jacket means. Centrally the deformable suction hood is connected by way of a flexible conduit 64 to a vacuum pump 65, which is stationarily mounted. Metallic pressure-transmitting structure 69 is provided in the hood 62 to transmit pressure from the base of the hood to the carrier unit and the hide, when the hood is deformed owing to the application of a vacuum to its interior through pipe 64. Plastic seals such as 70 are provided around the carrier frame 66a to provide an airtight seal between the heater plate 56 and the perforate sheet 66, and further seals 71 carried around the frame 63a provide a seal between the perforate sheet 66 and the hood periphery.

It will be seen that the general arrangement of the drying apparatus of FIG. 6 is similar to that described with reference to FIG. 1 with the added features that the carrier assembly is bodily withdrawable and insertable from and into the station for the discharging and charging of hides, and that the suction hood 62 is displaceable vertically by means of the actuators 61. Thus for withdrawal of the carrier assembly for unloading and loading purposes, the actuators 61 are operated to lower the suction hood, direction of movement being indicated by the arrow $C_1$, the carrier unit assembly including frame 66a is withdrawn horizontally from the apparatus, the dried skin thereon is changed for a wet one, and the carrier assembly is reintroduced and the actuators 61 are operated to raise the suction hood 62 to its operative position.

FIG. 7 schematically illustrates a three-level charging and discharging arrangement conveniently used with the drying apparatus just described. The charge-discharge unit generally designated 72 has three operating levels, upper level H, middle level M and lower level B. A fresh hide to be treated is initially stored on a carrier assembly positioned at low level B. When the carrier assembly of a drying unit 73 with which the charge-discharge device 72 is associated is withdrawn out of the apparatus as earlier described, the withdrawn carrier with the dried skin thereon is placed on middle level M. A fresh hide is placed on the carrier at top level H. The carriers at levels B and M are then shifted one level higher to the levels M and H respectively, while the carrier at level H is placed at low level B. The initially stored wet skin is now positioned at the mid-level M and the carrier supporting it is charged into the drying apparatus, while the dry skin now at top level H is removed.

The apparatus described with reference to FIG. 6 (and FIG. 7) is of especial advantage in connection with a multiple-station drying system of the type shown in FIGS. 3 and 4. The indexing of the turntable 40 (FIG. 4) from each operative position to the next can then be effected during the charging and discharging operations performed with the apparatus 72 (FIG. 7), thereby gaining time and increasing the output.

FIG. 8 schematically illustrates part of a multi-station drying plant of the same general type as that shown in FIGS. 3 and 4 but somewhat modified. The figure shows a central turntable 76 indexable about the vertical axis XX' and also shows at 75 one of a circumferential series of drying stations. Mounted on the turntable 76 is radially extending arm 77 which is slidable in a radial direction in a pair of uprights upstanding from the turntable. The arm 77 carries a set of actuators such as 74 which cooperate with the heating table and/or the vacuum suction hood of the drying station in the outwardly projected position of arm 77 in order to move the table and hood and out of their sealed cooperating relationship. The arm 77 also serves to withdraw and introduce the carrier assembly with a hide thereon out of and into the drying apparatus 75. It will be seen that this modification permits considerable simplificaion in the construction of each of the drying stations with respect to the construction of FIG. 7. Thus, instead of providing say four actuators per drying station, i.e., 32 actuators in all in the case of an eight-station plant, only four actuators in all need here be provided, being positioned on the radially slidable arm 77.

According to another modification of the multi-station drying plant, not illustrated, the drying units may be so supported and arranged as to permit rotation of a radial arm fixedly projecting from the turntable through each drying station without requiring the arm to be retracted for the discharging-charging operations.

FIGS. 9a, 9b and 9c illustrate a form of construction of a heater table usable in a drying plant according to the invention, as an alternative to the heater table construction described with reference to FIG. 5. In this form the heater table is made up from a plurality of sections, e.g., extruded or die-cast from suitable light alloy, two such sections 78 and 79 being here shown, welded together as at 80. Each section is formed with spaced upper and lower walls 82 and 83 interconnected by vertical partitions so formed, as shown in FIG. 9a, as to provide channels 81 in each plate section defining a circuitous flow path for heating fluid as indicated by the arrows. Conveniently, cover plates such as 86 are used to seal the end openings such as 84, 85 of the channels 81 except at the inlet and outlet ends of the abovementioned circuitous flow-paths. An inlet manifold 89 has a flanged end part 87 securable over the inlet openings of the flowpaths in both plate sections 78, 79, and a pair of outlet manifolds or conduits 90 have flanged end parts 88 securable over the outlet openings of said flowpaths. The channels 81 are formed with relatively large sectional areas so as to impart a comparatively low flow velocity to the heating fluid through the resulting heater plate or table, thereby to ensure a uniform distribution of temperatures throughout the surface area of the table.

FIG. 10 illustrates the layout of a modified multistation drying plant which is simplified with respect to the plant shown in FIGS. 3 and 4. The plant comprises four drying stations A, B, A' and B', disposed at the four corners of a rectangle, with the longitudinal midlines of stations A and A' being aligned along one, XX', of the diagonals of the rectangle and the midlines of stations B and B' aligned along the other diagonal YY' thereof. In the free central area of the rectangle there is provided a charge-discharge table 95 which is oscillable about a vertical centre axis O between two operative positions. In one position, shown in full lines, the table 95 is aligned with both drying stations A and A', and in its other position, shown dotted, the table is aligned with the drying stations B and B'. The figure further shows a pair of stands 96 and 97 which may serve to receive fresh and dried skins respectively. In operation, with the servicing table 95 positioned as shown in full lines, dried skins are extracted from both drying stations A and A', simultaneously or in succession, and wet skins are introduced into both said stations. Then the service table 95 is rotated to its other position and the drying stations B and B' are serviced in the same manner. Operations may be manual, semi-automatic or automatic as desired. This lay-out is advantageously simple and economical in labour and motive power requirements.

As mentioned earlier with reference to FIGS. 1 and 2, the condensed fluid constituents from the hides treated in a drying station according to the invention are drawn out of the drying apparatus through the vacuum hood by a vacuum pump connected to said hood. FIG. 11 schematically illustrates the related part of the drying apparatus in one embodiment of the invention. The vacuum hood 98 is connected by a flexible conduit 99 with an upper inlet of a condenser and-separator tank 100, so that the hood 98 may move up and down as indicated by the arrow $D_1$. The tank 100 has a bottom outlet 102 provided with a cut-off valve 101 and overlying a drainage trough or ditch 103. Connected with an upper side outlet of the tank 100 is a pipe 105 having a three-way valve 106 therein and leading to the intake of a vacuum pump 104. The condenser tank 100 further has a water cooling coil 107 associated with it, said cooling coil having an intake and an outlet for cooling water. In the exemplary embodiment shown, the vacuum pump 104 used is of the socalled "liquid annulus" type, in which a centrifugally-formed revolving annulus of liquid, oil or water, serves to define the working chamber in the pump. Advantageously the liquid serving to provide the liquid annulus in pump 104 is the cooling water flowing through coil 107. Accordingly, the outlet end of cooling coil 107 is shown connected by a pipe 111 with a water inlet for pump 104, and the water outlet from the pump discharges through a pipe 108 into the drain. Water is delivered to the inlet end of cooling coil 107 through any suitable means not shown.

In operation, the valves 101 and 106 are preferably ganged for simultaneous operation in a cyclic sequence. In a first phase of the operating cycle three-way valve 106 is positioned as in FIG. 11a, wherein the vapour outlet from tank 100 is vented to atmosphere at 109, and the intake of pump 104 is isolated. At the same time the cut-off valve 101 is open, whereupon condensation products 110 previously extracted from the dried hides and accumulating in the bottom of tank 100 are discharged to the drain. In the succeeding phase of the cycle three-way valve 106 is moved to the position shown in FIG. 11b wherein the vapour outlet of the condenser tank 100 is connected to the suction intake of pump 104 and isolated from atmosphere; at the same time cutoff valve 101 is closed. Vacuum is now applied both into the suction hood 98 of the drying station and the tank 100, and drying of a hide positioned in the station proceeds. The main advantage of this arrangement lies in the use of a common pump for creating the requisite vacuum in the drying apparatus and for discharging the effluent, and also in the fact that effluent discharge can be effected during the idle periods in which the unloading and loading of the hides from and into the drying station is performed, thereby saving time.

FIGS. 12, 13 present a modified form of embodiment of drying apparatus of the general type described with reference to FIGS. 6 and 11. In this case the deformable suction hood member 201 comprises a generally flat metal sheet having a flanged periphery 202 welded as at 204 to an outer frame 205 provided with sealing strips 206 as earlier described. The sheet 201 is centrally connected with the discharge outlet 203. The sheet member 201 is deformable to a small but significant extent between the flat horizontal condition shown in FIG. 12, assumed by it on application of suction to the connection 203 (the "drying phase" of the work cycle), and the conical condition shown in FIG. 13 in the absence of suction (the "venting" or "effluent-discharge" phase of the cycle). In this embodiment moreover the pressure-transmitting assembly is supported entirely from the hide-carrier assembly, and is here shown as comprising a stack of wire mesh screens 208 and perforate sheet 209. A hide 207 is shown supported on top of this assembly. On creation of a vacuum in the suction hood 201, this hood assumes the flat condition shown in FIG. 12 and pressure from it is directly transmitted to the perforate supporting assembly and the hide 207. It will be noted that the welded joint at 204 is not subjected to reciprocatory deformations liable to damage it during the cyclic deformations of the hood.

Referring to FIG. 13 which shows the suction-and-effluent-discharge system as used in this embodiment, it will be noted that a separator tank 212 is herein directly suspended from the centre of the hood 201 by way of the short outlet pipe 203. The tank 212 has a bottom discharge outlet 213 provided with a cutoff valve 214 and overlying a drainage ditch. A vapour outlet from an upper part of tank 212 is connected by way of a flexible pipe 215 with the intake of vacuum pump 217. A three-way vent valve 218 is interposed in the suction pipe 215. The weight of the assembly suspended from the hood 201 and including condenser tank 212 and associated parts, is so predetermined that in the absence of suction applied to the suction hood 201, the hood 201 will sag to the slightly-conical form shown in FIG. 13, thereby facilitating discharge of liquid effluents from the hides. It will be understood in this connection that a substantial portion of the vapours discharged from the drying hide 207 will already condense as they pass through the relatively cool perforate supporting and pressure-transmitting assembly 208-209 (FIG. 12). The valves 213 and 218 may be ganged for simultaneous operation in a manner similar to that described for the corresponding valves 101 and 109 in FIG. 11.

In the operation of a drying apparatus of the kind described, e.g., with reference to FIGS. 12 and 13, it is found that the dry hide sometimes has a tendency to stick to the under surface of the heating table, and difficulty may be experienced to separate it from the table without damaging it in case of the more delicate kinds of skins. Means will now be described for effecting such separation in a convenient and safe manner.

As shown in FIG. 14, the heating table of the invention, schematically indicated at 217a, is formed with rows of vertical nozzle passages such as 222 and 223 at its respective ends. A pair of pressure fluid manifolds 218a and 219 are mounted on the respective ends of the table so as to overlie the upper orifices of the rows of passages 222 and 223 respectively. The manifolds 218a and 219 are connected with a source of pressure fluid, e.g., compressed air, by way of valves 220 and 221, which may conveniently be electromagnetically actuated. After a hide such as 224 applied to the under surface of table 217a has been dried, the valves 220 and 221 are actuated to discharge jets of pressure fluid through passages or nozzles 222 and 223 in order to separate the end parts such as A and B of the hide from the table surface, whereupon complete separation of the hide is facilitated. If desired, the separating means may be provided at only one end of the table instead of both ends as shown.

FIG. 15 shows a practical embodiment of separating means of the type just described as applied to a heating table structure of the type earlier described with reference to FIG. 9. It will be seen that the nozzle passages 227 are formed vertically through the table between the heating ducts 226 therein. The compressed-air manifold is here designated 228, and the valve for connection with the source of pressure fluid is designated 229.

In accordance with FIGS. 16a and 16b, it will be noted that the fluid discharge passages or nozzles here designated 230, provided at one or at each end of the heating table 231, may advantageously be positioned in a staggered formation. The pressure fluid manifold is here designated 232.

A pressure-fluid discharge device of the kind just described with reference to FIGS. 14-16 serves to separate one or each end of a skin clinging to the under surface of the heating table. In many cases such action will be sufficient and the skin can then be easily completely separated from the table. In certain instances however, especially in the case of automatic drying plant according to the invention, it is desirable to provide means for completing the separating operation mechanically and such means are shown in FIGS. 17-18. Underneath the heating table here designated 234 there is provided a pair of endless chain assemblies 235 mounted on end sprockets 238 driven from a motor 239 and retained in guide channels 236 (FIG. 18). A fine wire 233 made of stainless steel or the like is stretched transversely of the table across corresponding points of the respective endless chains 235, the ends of the wire 233 being connected to the respective chains by way of coil spring sections 237 (FIG. 18) to impart suitable tension to the wire. As shown in FIG. 17a, the table 234 is provided at one or each end thereof with a fluid-discharge end-separating arrangement of the type described with reference to FIGS. 14-16 and including an electrovalve 220. The automatic control sequence of the plant is such that after valve 220 has been actuated to separate the end portion A of the hide from the under surface of the table, motor 239 is operated to rotate both chains 235 and thus draw the wire 233 across the under surface of table 234 the full length thereof, thereby separating the hide completely from the table, the hide then dropping on to the underlying carrier assembly to be conveniently withdrawn therewith from out of the drying station.

In some instances of use of drying plant according to the invention two (or more) skins may be simultaneously treated in a common drying station. For such cases a fluid-discharge end-separating arrangement may be provided at each end of the table as shown in FIG. 14, and the motor 239 may be operated at each cycle to impart two-way traversing reciprocations to the wire 233 from each end of the table in order to strip each of the skins in succession.

FIGS. 19 and 20 illustrate a practical embodiment of a drying apparatus according to the invention, generally similar to the form shown in FIG. 12 earlier described. The apparatus comprises a heating table 301 adapted to engage peripherally a carrier frame 302. Frame 302 is formed with a shoulder or shelf surface 304 upon which the periphery of a pressure-transmitting perforate supporting assembly 303 freely rests, so as to press a hide 305 positioned thereon against the under surface of table 301 as earlier described. A sealing strip 307 positioned in a groove 306 of the frame 302 provides an airtight seal with the under surface of the table 301. Under frame 302 there is positioned a lower frame 309 which has a sealing strip 311 in a groove 310 thereof for airtight sealing engagement with the under surface of upper frame 302. A shelf surface 312 provided on frame 309 has bonded thereto, in any suitable manner, e.g., adhesively, the peripheral part of a flexible sheet 313 defining the deformable suction hood of the apparatus. Flexible sheet 313 is made of suitable plastic or elastomer sheet material in the present embodiment. The central part of flexible sheet 313 has a pipe section 314 connecting with a central opening therein and secured in place by way of a flexible sheet element 315 bonded to the under side of sheet 313 so as to clamp between it and sheet 313 a flange of the pipe section 314. Connected to pipe section 314 is a flexible hose 315a leading to the upper inlet of a condenser and separator tank 316. The bottom outlet of tank 316 is connected through a cutoff valve 318 with a discharge outlet 317 overlying a drain ditch 319. A side opening in the separator tank 316 is connected by a line 320 with the intake of a suction pump 323. In this embodiment line 320 has a cutoff valve 322 and a vent valve 321 mounted in it, but it will be evident that this pair of valves may be replaced by a single three-way valve as earlier described. It will be noted that the chief difference of the condensate-discharge and vacuum section of the apparatus shown in FIG. 19, over the corresponding section of the apparatus shown in FIG. 13, is that in this case the separator tank is not suspended rigidly from the lower end of the suction hood as was the case in FIG. 13. In the present instance, the weight of the flexible sheet 313 and pipe section 314 secured to it should be sufficient to cause the sheet 313 to sag in the venting phase of the work cycle, as shown in FIG. 19. The direction of this movement is indicated by the arrow $E_1$.

When in the drying phase of the work cycle suction is applied by means of pump 323 to the interior of the suction hood above sheet 313, the apparatus assumes the condition shown in FIG. 20. It will be seen that the suction has applied the flexible sheet 313 against the pressure-transmitting perforate supporting assembly 303 thereby applying the hide 305 against the under side of the heating table. It will be noticed that the upper frame 302 is formed with a rounded inner peripheral portion 308 in its lower part (also see FIG. 19) against which the flexible sheet 313 is now smoothly applied. The frames 309 and 302 have been raised into firm sealing engagement with one another and with the under surface of table 301. Owing to the provision of the rounded bearing surface 308 radial shear stresses as would otherwise be exerted on the bonded peripheral portions 312 of the flexible sheet 313 are greatly reduced. The deformation of the flexible plastic or the like sheet 313 is such as to press the hide continuously throughout its entire surface against the under surface of the heating table, regardless of minor variations in the thickness of the hide. Moreover, the perforate pressure-transmitting support 303 since it is freely supported on the shelf 304, is able to shift vertically as required to take up differences in thickness of the hides treated within a wide range, thus making it possible to process a wide variety of animal hides in a common drying plant.

FIG. 21 illustrates a modification of the structure just described. The difference lies in that the flexible sheet here designated 331 itself serves as the sealing means between the lower frame 333 and upper frame 335. For the purpose the margins of flexible sheet 331 are extended over and outwardly around the lower frame 333 and secured to the outer sides of the frame as with screws 332. Ribs 334 provided on the upper surface of frame 333 serve to press the sheet 331 firmly against the under surface of frame 335 and provide a tight seal. This construction is advantageous not only because it simplifies the construction of the lower frame 333 through elimination of the sealing groove and sealing strip therein, but it also protects the lower frame 333 from contact with the corrosive effluent fluid from the hides, so that said frame may be made from low-cost materials.

In the embodiment of the invention illustrated in FIG. 22, the drying apparatus includes a heating table 401 shown as having its active under surface 402 coated with a protective coating 403, e.g., "Teflon"-base varnish. This reduces the tendency of the skins to stick to the table surface and may protect the material of the table against the corrosive action of possible effluent fluids (e.g., from pickled skins). Under the table is positioned a frame 404 provided with rollers such as 405 projecting from its sides and running on ways 406 for withdrawal and insertion of the frame 404 from and into the drying station, during charging-discharging operations. A sealing bead 407 is positioned in a groove 408 in the upper surface of the frame for tight engagement with the under surface of table 401 in the operative condition of the apparatus. Bonded to a shelf surface 410 of the frame 404 is the periphery of flexible sheet 409 constituting the deformable suction hood of the apparatus. Attached to a central opening of the sheet 409 is a small-capacity tank 411 for receiving the effluents, and provided with a discharge pipe 413 having a cutoff valve 412 therein and overhanging the drainage ditch 414. To limit the sag of the flexible sheet 409 under its own weight and that of the tank 411 and connected appliances depending from it, there is provided a rigid metal sheet member 409a secured peripherally to the under surface of frame 404 and apertured centrally for passage of tank 411. In the idle condition or the venting phase of the work cycle of the apparatus shown, i.e., in the absence of suction applied to the hood, the flexible sheet 409 sags by gravity into central engagement with the upper surface of rigid sheet 409a to assume the conical shape indicated. The frame 404 further supports a perforated pressure-transmitting and hide-supporting structure 415 on which is placed a hide 416 to be treated. The structure 415 is compressible and preferably comprises a stack of stainless-steel wire mesh elements such as 417 and 418 (FIG. 23) in interwoven relationship. Preferably the mesh elements are of increasing mesh size from top to bottom of the structure to reduce the tendency to clogging as the effluents condense. The compressibility of the structure 415 enables it to accommodate variations in hide thickness from point to point as well as from hide to hide. Further the supporting structure 415 is preferably supported freely from the frame 404 and the deformation of the flexible sheet 409 ensures uniform pressure throughout the surface of the hide, regardless of minor variations in skin thickness, as earlier explained. It will be understood that in this as in precedingly described embodiments the frame 404 with the parts carried by it including flexible suction hood 409 with plate 409a, and the perforated supporting structure 415, is deplaceable vertically as indicated by the arrows F1, F2, F3 between its operative position in engagement with the undersurface of table 401, and its lowered, charge-discharge position.

In the embodiment being described it will be noted that the vacuum connection with the interior of the suction hood is separated from the central effluent outlet. This may be advantageous since it reduces the risk of spraying effluent on to the hide at the instant the suction hood is first vented to atmosphere, as is sometimes found to occur otherwise especially when a flexible hood 409 is used, since part of the condensed effluent may collect in the small cavities impressed in the flexible hood surface by the under surface of the wire mesh structure 415, and may then be projected as a spray when atmospheric air enters the hood. This arrangement of the vacuum connection separate from the effluent discharge outlet also makes it possible to dispense with the use of a condenser-separator tank, which may be advtantageous in the present construction. The vacuum connection 419 is shown provided near the periphery of the hood, and projects through a hole in the sag-limiting sheet 409a for connection with a flexible hose 420 leading to the vacuum pump 421. The hose 420 includes an air vent valve 422 and a cutoff valve 425, which may be automatically operated. The hose 420 is long and flexible enough not to interfere with the horizontal displacements of the frame 404 between its operative position under the heating table 401 and its withdrawn, charge-discharge position. A deflector or baffle plate 424 is shown mounted above the orifice of the connecting pipe 419 to screen the hide from possible spraying with condensed effluent on venting. If desired more than one vacuum connection such as 419 may be provided around the periphery of the suction hood 409. In addition to the advantages mentioned above, the embodiment of FIGS. 22–23 uses only a single frame instead of the two shown, e.g., in FIGS. 19–21, thereby lowering costs and eliminating a source of possible leakage. The flexibility of the perforated supporting structure 415 made of stacked wire mesh as described improves the surface condition of the dried skins. The plastic coating 403 reduces the tendency of the skins to stick to the table and may eliminate the need for the skin-separating means earlier described.

In the embodiment shown in FIG. 24, components corresponding to components in FIG. 22 are designated with the same numerals. However, steps are here taken to render the annular space A defined between the under surface of sheet 409 and the lower limiting sheet 409a airtight, and a sliding seal 501 is accordingly provided to permit the up-and-down movements of the central receiver tank 411 through the limiting sheet 409a. A main vacuum connection including flexible hose 510 is tapped off a side of tank 411 near the bottom end of it. An auxiliary vacuum connection 511 is made through the sheet 409a with the annular space A. By applying different degrees of suction through the connections 510 and 511 it is possible to create a resultant differential pressure acting to force the deformable hood 409 upwards, with a reduced force as may be required in the processing of delicate skins for example. A differential pressure-gauge 514 connected through piping 512 across the annular space A and the space B (which in turn communicates with the main vacuum space above hood 409) permits an accurate determination and control of the differential pressure applied.

In the embodiment shown in FIG. 25, parts corresponding to those in FIG. 22 are given the same reference numbers. The general arrangement is the same as in that figure, with the two vacuum connections being shown at 419 and 419a. This embodiment provides auxiliary means for condensing any effluent substances that may have failed to condense in the suction hood and have entered vacuum pipes 419 and 419a in the vapour phase. As shown the vacuum pipes 419 and 419a are connected by way of enlarged chamber sections with a common line 609 connected with the vacuum pump, not shown, advantageously a pump of the liquid annulus type earlier referred to. Positioned in the pipes 619, 619a just above the enlarged chambers are spray nozzles 610, 611 connected by way of pipes 612, 616 with the bottom of a constant-level tank 614 containing a cooling liquid such as water, supplied thereto by a line 615. When suction is applied from the pump through line 609 to the discharge pipes 419, 419', the suction draws in water from tank 614 through lines 612 and 616 to be discharged as a fine spray from spray nozzles 610 and 611 for condensing the residual vapours. When the suction is cut off and the hood and discharge pipes 419 and 419a are vented to atmospheric pressure, the spray is automatically arrested since there then is no pressure difference present to draw in water from the tank 614.

FIGS. 26 and 27 illustrate an embodiment of the invention wherein the suction hood is connectable with the vacuum pump from above, through the heating table, rather than from below the suction hood as in all the preceding embodiments. The drying unit includes a frame 710 mounted on supports 711. The frame 710 is fitted with a sealing strip 712 in a peripheral groove formed in its upper surface, and has the flexible sheet 715 constituting the hood sealingly secured to it by means of screws 714. A lower sag-limiting plate 716 is also provided beneath flexible sheet 715. Freely resting on suitable supports or shims above the periphery of flexible sheet 715 is a perforate metal plate 713, overlying which is a perforate pressure-transmitting structure 717, e.g., a stack of wire mesh members, and possibly followed by a porous compressible sheet 718, e.g., felt, upon which the hides such as 719 are adapted to rest. The heating table 701 is formed with ducts 702 for the circulation of heating fluid, and with other ducts 703, extending along the sides of the table, and separate from the heating ducts 702, the additional ducts 703 being connected with a vacuum pump as presently described. The pumping ducts 703 are all interconnected from place to place as indicated at 704, and one or more of the pumping ducts is further made to communicate with the internal space of the hood above flexible sheet 715 through a series of holes such as 708 formed in the bottom wall of the duct 703. Fixed heat lagging structure 701a is positioned above the heating table, and a vacuum manifold 707 (FIG. 27) extends therefrom and connects with a plurality of branch conduits 706 in structure 701a which in turn connect with the pumping ducts 703 in the table through vertical passages 705. The branch conduits 706 are preferably provided with thermal insulation and, moreover, the conduits 706–707 are arranged so as to slope downwardly towards the vacuum pump, not shown.

It will thus be understood that vacuum is applied from the pump (not shown) to the suction hood (i.e., the space above the flexible sheet 715) by way of the conduits 707, 706, 705, ducts 703, holes 708, into the peripheral space 708a inward of the seal 712.

The removal felt element 718 though not essential serves to absorb metal salt solutions which could otherwise soil the periphery of the hides, and reduces wrinkling. The felt member can be easily replaced when soiled or when treating skins dyed in different colours.

In this embodiment the support 711 is provided with means, not shown, for moving it up and down with respect to the table 701 and the overlying structure 701a, which is stationary, and also for displacing it horizontally for charging and discharging purposes. It will be noted that in this construction the pumping conduits 703 in the heating table 701 are maintained at a moderately elevated temperature due to heat conduction from the fluid in conduits 701 through the metallic material of the table. This prevents unwanted condensation of any vapour-phase constituents entering the pumping ducts 703.

FIG. 28 illustrates an embodiment of the invention which is similar to the one just described in that the evacuating and venting of the suction hood is effected from above through the heating table, but in which the construction of the heating table is somewhat simplified. The heating table in this case comprises a pair of vertically spaced sheet members 720 and 722, e.g., of steel, with the lower member 720 having its under surface plated or coated with a suitable protective coating 721, e.g., stainless steel or plastic. Parallel longitudinal ducts are defined through the table between upper and lower sheet members 722 and 720. As shown, channel sections such as 724 are spaced across the table and have their upwardly positioned webs 723 welded or not to the upper sheet member 722 and the edges of their side flanges welded to the lower sheet member 720. Tubular spacers 725 are shown as extending through the webs of channels 724, with their lower ends welded as at 726 to the lower sheet member 720 and their upper ends 727 projecting through holes in the web of the channel 724 and in the upper sheet member 722. Other channel members 728 are positioned near the sides of the table and have their side flanges welded as at 729 and 729a to the lower and upper sheet members 720 and 722. The sides of the table are defined by side channel members 730 having their vertical webs welded as at 730a and 730b to be lower and upper sheet members, the web projecting somewhat above the upper sheet member 722 as shown. Cross members such as 734, which may be channels or angles, extend across the upper surface of upper sheet member 722 in spaced relation along the table. The heating table as a whole is supported on a stand including uprights such as 737 having their upper ends bolted as at 736 to the bottom flanges of the side channels 730.

As mentioned above longitudinal ducts are defined between and within the channel members such as 724 and 728 in the table. Most of these ducts such as 727a are heating ducts and are connected to hot water circulating means not shown. The end ducts such as 731 extending along the sides of the table are pumping ducts, and these latter communicate through holes 732 in bottom sheet member 720 with the interior space in the suction hood, presently described, and communicate through holes 733 in upper sheet member 722 with conduits, not shown, leading to a vacuum pump as in the preceding embodiment.

The uprights 737 support by means of suitable brackets, a set of fluid actuators such as 738, on which are mounted intermediate supports 740 provided with outwardly projecting rollers 742 engageable with runways 741 secured to the uprights 737. The intermediate supports 740 in turn carry the frame 739, which may be similar to the corresponding frames in preceding embodiments, having sealing strips engageable with the under surface of the table and having a flexible sheet member or hood 750 marginally secured thereto. It will be understood that the actuators 738 are operated to their extended condition to raise the frame structure off the runways 741 and into sealing engagement with the heating table in the vacuum drying phase of the work cycle of the apparatus, and are retracted to lower the frame structure on to the runways 741 (as shown) whereupon the frame unit with a skin carried thereon can be bodily withdrawn out of the apparatus for charging-discharging operations. In FIG. 28, the perforated pressure-transmitting and hide-carrying assembly has not been shown, but may be similar to the corresponding assemblies shown in preceding embodiments. Also it will be understood that the discharge of condensed effluent is effected through a central outlet provided in flexible sheet 750 as earlier described.

An advantage of an embodiment such as that shown in FIG. 27 or 28 wherein the hood evacuating and venting ducts are all stationary, is that each drying station thus constructed can have more than one (e.g., two) hide-supporting frame assemblies associated with it, i.e., assemblies each including support 740 with its rollers 742, frame 739 with flexible sheet 750 attached, and pressure-transmitting structure (not shown). FIG. 29 indicates in schematic elevation how a drying cycle may be conducted in such circumstances. In this figure reference 743 designates the heating table of a drying station such as that shown in FIG. 28. In the upper part of the diagram a carrier frame designated 744 is shown positioned in operative relation beneath the heating table 743, with a hide (not shown) supported on said frame to be dried. At that time another similar carrier frame designated 745 is shown in withdrawn position beyond one longitudinal end (the right end) of table 743 where it is serviced for removal of the dried skin thereon and insertion of a fresh skin to be dried. In the next work cycle, as indicated in dotted lines in the lower part of the figure, the frame 744 is withdrawn out of the drying apparatus beyond the other (left) longitudinal end of it for servicing, while the frame 745 is now inserted into the apparatus for the drying stage of the cycle. It will be understood that movement of the frames into and out of the apparatus is effected through rollers 742 on runways 741 (FIG. 28) which are open at both ends, as indicated by the two-way arrow F2, through any suitable drive means. It will be evident that the work cycle may in this way be considerably accelerated.

Vacuum drying apparatus according to the invention regardless of the particular structural embodiment used has many and important advantages in connection with the drying of animal skins and similar flat articles. Most of these advantages derive essentially from the "inverted" lay-out of the drying apparatus of the invention, according to which the article is heated at its upper surface and exposed to vacuum at its under surface thereby permitting free outflow of the fluid constituents by gravity.

Since the hide is positioned on a cool unheated supporting surface when at atmospheric pressure, blistering due to production of water vapour at atmospheric pressure is prevented; hardening of the marginal parts of the skin as will often occur when the skins are laid out on heated surfaces is also avoided. Thus the quality of the dried skin is improved and thin skins processed by vegetable tanning methods can be dried effectively without damage. The cool supporting surface preferably comprising stacked wire mesh elements of stainless steel or the like, with the mesh size increasing in a downward direction to avoid clogging, serves to condense the extracted vapours without the liquid condensate streaming over the skins.

Since the pumping unit serves only or chiefly to pump air and uncondensable gaseous constituents, while the water and other condensed liquids are discharged by gravity when atmospheric pressure is restored, the size and power rating of the pumping unit used can be greatly reduced with a corresponding reduction in the energy consumed. It has in fact been found in the practical use of the apparatus that a considerable fraction, up to about 30% or more, of the liquid constituents in the hides is extracted by the action of gravity to collect in liquid phase in the bottom on the hood after having been condensed on the cool wire mesh and other parts of the structure during the vacuum drying phase of the work cycle. This not only reduces pumping energy requirements as just indicated but eliminates the need of pressing and draining operations currently required, liable to damage delicate skins especially in respect to adherence of the grain.

Another factor preventing damage to delicate skins and improving the quality of the final product is that the hide is not stretched when placed in the drying apparatus, contrary to what generally occurs in conventional hide-drying apparatus. The resulting absence of tension strains in the skin leads to greatly improved flexibility in the dried skin. At the same time wrinkling is prevented or reduced, especially owing to the uniform distribution of pressure to the entire surface of the skin by the supporting means earlier described, irrespective of local variations of thickness in a given hide or from one hide to another.

The use of a removable porous element, such as a felt element interposed between the perforate pressure-transmitting structure and the hide prevents staining the skins through deposit of metal salts especially at the periphery of the skin.

According to one desirable procedure when operating a vacuum drying unit according to the invention, the centre of the flexible hood may be lifted prior to application of the vacuum, as by forcing the central discharge outlet upward with a suitable actuator, so as to apply the central portion of the hood upwardly against the central part of the hide to be dried. On application of the suction in such conditions pressure is initially applied to the central area of the hide and the hide is gradually pressed against the heating surface progressively from the centre outwards. This procedure serves both to minimize wrinkling in the dried skin and also reduces the volume to be evacuated, shortening the duration of the drying phase.

Vacuum drying apparatus according to the invention permits of simple and accurate regulation in respect to the parameters temperature, pressure and time, so as to achieve a precisely predetermined and uniform final degree of humidity in the dried skins. It is usually desired that such final degree of humidity be within an approximate range of from 12 to 14%, and the ease of regulation available with the apparatus of the invention makes it possible to achieve the desired tolerances more consistently and reliably than with conventional drying apparatus.

Servicing of the improved apparatus especially in regard to charging and discharging is extremely simple, fast and economical of human labour. This is due in part to the fact that the hides do not have to be stretched over a drying frame, a relatively long and delicate process, and in part to the means, described herein, for bodily withdrawing and inserting the hide carrier frames horizontally out of and into the apparatus. All of these operations as well as the other phases of the drying process are readily amenable to automation to the extent this may be desired.

It may finally be noted that the apparatus of the invention can very simply be associated with a pumping unit of the type disclosed in the applicant's French patent application provisional Ser. No. 910,533, filed September 26, 1962, whereby any solvents used in processing the hides prior to drying, as for impregnation with resinous or other agents, can conveniently be recovered.

It will be understood that various embodiments and modifications of the invention other than those specifically described and illustrated herein may be applied without exceeding the scope of the invention. It will also be clear that the invention in its broader aspects is applicable with advantage to the drying of flat or sheet-like articles other than animal hides and skins.

I claim:

1. Apparatus for drying the sheet-like article including hides and skins comprising:
   frame structure including heating means having a generally flat downwardly directed heating surface;
   perforate supporting means having an upwardly directed surface upon which the article is adapted to rest;
   a deformable hood-like member supported from the frame structure below said heating surface and enclosing the article supporting means, said member including an upwardly-directed surface portion in pressure-transmitting relationship with an under surface of the supporting means;
   means for sealingly securing the periphery of said deformable member to said frame structure around said heating surface and supporting means whereby to define a variable-volume sealed enclosure around and below an article supported thereon;

means connected with said enclosure and connectable to a suction source to apply suction to the interior of the enclosure whereby to cause upward deformation of said deformable member, and whereby to transmit upwardly directed pressure through said supporting means to apply the article upwards against said heating surface; and effluent discharge means connected with said enclosure for discharging effluent fluids issuing from said article.

2. Apparatus according to claim 1, wherein the supporting means comprises perforated metallic structure, e.g. stacked wire mesh members.

3. Apparatus according to claim 1, wherein the supporting means includes a topmost porous deformable element, e.g. felt, engagable with the under side of the article.

4. Apparatus according to claim 1, wherein the heating means and the deformable member are relatively displaceable vertically into and out of peripheral sealing engagement with each other.

5. Apparatus according to claim 4, wherein the deformable member is peripherally supported in a frame supported for vertical displacement relatively to stationary structure including the heating means.

6. Apparatus according to claim 1, where in the article supporting means are supported in a frame mounted on horizontal ways for withdrawal and insertion of the supporting means with an article supported thereon out of and into the apparatus, preferably from either end of said apparatus.

7. Apparatus according to claim 1, wherein the effluent discharging means comprises an outlet pipe depending from the centre of the deformable member.

8. Apparatus according to claim 7, wherein said outlet pipe leads to a separator tank.

9. Apparatus according to claim 8, wherein the separator tank is fixed and is connected with said outlet pipe through a flexible hose connection.

10. Apparatus according to claim 8, wherein the condenser-separator tank is connected with said outlet pipe directly so as to be suspeded by gravity from said deformable member.

11. Apparatus according to claim 8, wherein the means for applying suction to the interior of said enclosure, comprises a vacuum pump connected with said effluent-discharging outlet pipe.

12. Apparatus according to claim 11, wherein said separator tank has a bottom outlet connected to disposal means for said effluent, and has a side outlet connected to the intake of the vacuum pump, there is provided a first valve means selectively operable to open or close said bottom outlet, second valve means selectively operable to connect said side outlet either with said pump intake or with atmosphere, and means for operating both valve means concurrently so as to open said bottom outlet and connect said side outlet with atmosphere, or close said bottom outlet and connect said side outlet with the pump intake.

13. Apparatus according to claim 1, wherein the deformable member is made of sheet metal.

14. Apparatus according to claim 1, wherein the deformable member is made of a flexible sheet material, e.g. plastic sheet.

15. Apparatus according to claim 14, having a rigid plate member underlying the flexible sheet constituting the deformable member for limiting the downward sag thereof.

16. Apparatus according to claim 5, wherein said article supporting means is freely supported at its periphery on said frame.

17. Apparatus according to claim 5, including a second frame underlying said first frame and peripherally supporting the deformable member, both said frame being vertically displaceable into and out of sealing engagement with one another and with the under surface of said heating means.

18. Apparatus according to claim 17, wherein said deformable sheet member extends over the upper surface of said second frame to participate in the sealing engagement of said second frame with said first frame.

19. Apparatus according to claim 17, wherein the upper frame has a rounded inner bearing at its base for smooth engagement with said flexible deformable sheet member when in its upwardly deformed condition.

20. Apparatus according to claim 1, wherein the article-supporting means is directly supported peripherally on the periphery of said deformable member or on a frame supporting the latter.

21. Apparatus according to claim 20, wherein said deformable member and article-supporting means are bodily movable on horizontal ways for withdrawal and insertion thereof out of and into the apparatus.

22. Apparatus according to claim 1, wherein the means for applying suction to the interior of said enclosure comprise a vacuum pump connected with said enclosure through one or more suction conduits connected to the deformable member separately from said outlet pipe adjacent the periphery of said deformable member.

23. Apparatus according to claim 22, including means for spraying a cooling liquid into said, or each said, suction conduit.

24. Apparatus according to claim 23, including means for automatically operating said spraying means on application of suction into said enclosure.

25. Apparatus according to claim 1, including means defining a second sealed enclosure below said deformable member, and means for applying controlled, different degrees of suction to said respective enclosures for creating a controlled differential pressure tending to deform said deformable member.

26. Apparatus according to claim 25, wherein the means defining the second sealed enclosure comprises said rigid plate member.

27. Apparatus according to claim 1, wherein the means applying suction to said enclosure comprises a vacuum pump connected with said enclosure through one or more passages formed in the heating means.

28. Apparatus according to claim 1, including means for injecting a fluid under pressure through the heating surface adjacent at least one end of it to assist in separating a corresponding end of the dried article from said surface.

29. Apparatus according to claim 28, further including means for traversing a wire across said heating surfaces between the surface and the article to complete the separation of the article from the surface.

30. Apparatus according to claim 1, wherein said heating means comprises a table having flat vertically spaced upper and lower walls and means defining a flow circuit for a heating fluid between said walls.

31. Apparatus according to claim 30, having a smooth, non-corrodable substance coating the under surface of its bottom wall.

32. Drying plant comprising in combination a plurality of drying apparatus units each according to claim 6 and means defining a common charging-discharging station for all units and adapted to receive each of said article-supporting means when withdrawn from its related unit.

33. Drying plant according to claim 32, wherein said drying units are disposed in a circular array surrounding a turntable on which said charging-discharging station is disposed, and means for indexing the turntable in rotation to position said station in cooperative relation with each of said units in sequence.

34. Drying plant according to claim 32, including four drying units disposed at the apices of a rectangle and aligned in opposed pairs along the respective diagonals of the rectangle, and said common station comprises a table concentric with said rectangle and swingable about its vertical centre axis into alignment with each of said diagonals to service each of said opposed pairs of units.

35. Apparatus for drying sheet-like articles including hides and skins comprising:
   frame structure including heating means having a downwardly directed heating surface;
   perforate supporting means having an upwardly directed surface upon which the article is adapted to rest;
   a deformable hood-like member supported from the frame structure below said heating surface and enclosing the supporting means, said member having an upwardly directed surface portion in pressure-transmitting relationship with an under surface of the supporting means;
   means for sealingly securing the periphery of said deformable member to said frame structure around said heating surface and supporting means whereby to define a variable-volume sealed enclosure around and under an article supported thereon;
   effluent discharge conduit means connected with a central area of said deformable member for discharging effluent fluids issuing from said article out of the enclosure; and
   passage means connected with another area of said deformable member and connectable to a suction source to apply suction to the interior of the enclosure whereby to cause upward deformation of said deformable member, and whereby to transmit pressure upwardly through said supporting means to apply the article upwards against said heating surface.

36. Apparatus according to claim 35, including means for spraying a cooling liquid into said passage means to recondense any vaporized fraction of said effluent fluids.

References Cited by the Examiner

UNITED STATES PATENTS

| | | | |
|---|---|---|---|
| 2,095,118 | 10/1937 | Basler. | |
| 2,471,932 | 5/1949 | Chaplin | 34—146 X |
| 3,151,952 | 10/1964 | Turato | 34—151 X |
| 3,224,109 | 12/1965 | Turato | 34—143 X |

FREDERICK L. MATTESON, JR., *Primary Examiner.*

C. R. REMKE, *Assistant Examiner.*